United States Patent Office 3,086,403
Patented Apr. 23, 1963

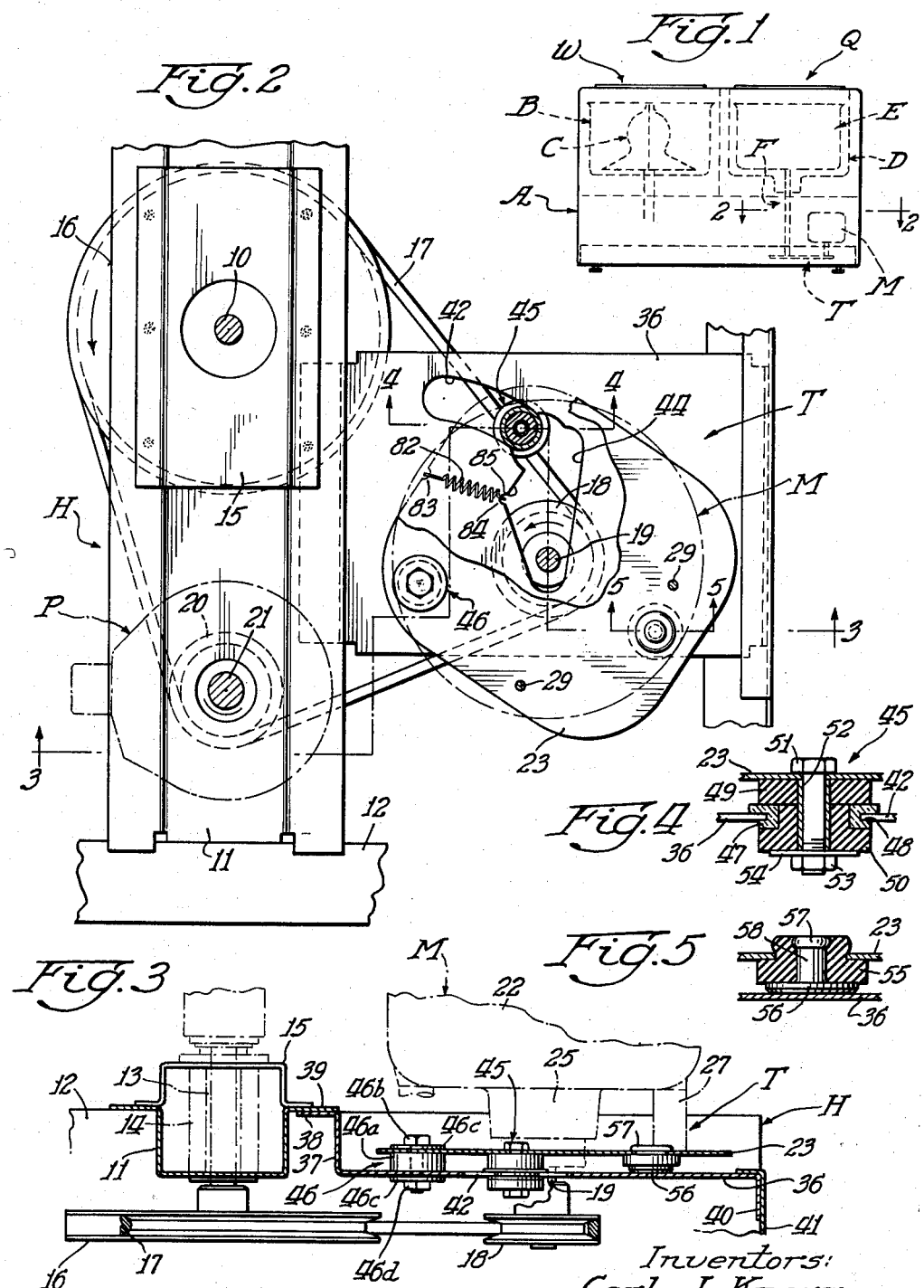

3,086,403
DRIVE ASSEMBLY
Carl J. Knerr and Charles R. Waldrop, Herrin, Ill., assignors to Borg-Warner Corporation, Chicago, Ill., a corporation of Illinois
Filed Oct. 4, 1960, Ser. No. 60,341
9 Claims. (Cl. 74—242.9)

This invention relates to a drive assembly and more particularly to a drive assembly for use with a drive shaft of a power unit.

An object of the invention is to provide an improved drive assembly of the belt and pulley type for use with a drive shaft of a power unit.

Another object of the invention is to provide an improved drive assembly of the belt and pulley type for machines employing a drive shaft and which is effective to automatically provide proper belt tension during rotation of the drive shaft.

Another object of the invention is to provide an improved drive assembly of the belt and pulley type as described wherein belt tension is automatically compensated in direct proportion to the load on the power unit.

Another object of the invention is to provide an improved drive assembly of the belt and pulley type characterized by a power unit pivotally movable, during rotation of its drive shaft, to predetermined positions in which belt tension is automatically compensated in direct proportion to the load on the power unit.

A further object of the invention is to provide an improved drive assembly of the belt and pulley type as described and having means for completely unloading the bearings of the power unit drive shaft and a driven shaft of side thrust by completely removing belt tension, when the machine is idle.

The improved drive assembly of the present invention is particularly, but not necessarily, designed for use in a washing machine having a power unit, such as a motor and drive mechanism, for transmitting drive from the motor to a shaft or shafts of the drive mechanism, the drive assembly being characterized by a belt in driving relation to pulleys of the motor and drive mechanism shafts, and pivotal mounting of the motor for movement, in a plane transverse to its axis of rotation, to positions in which the motor mounting is effective to provide automatic and variable belt tensioning, compensated in direct proportion to the motor load, to ensure continuous driving of the drive mechanism shaft pulleys by the belt, the improved drive assembly being further characterized by complete unloading of side thrusts on the motor and drive mechanism shaft bearings and complete removal of tension on the belt when the machine is idle.

Other objects and advantages of the invention will hereinafter appear in the following details of the description having reference to the accompanying drawings forming a part of this specification.

In the drawings:

FIG. 1 is a side elevational view of a clothes washing and centrifugal clothes drying machine illustrating the relative disposition of the drive assembly embodying the features of the present invention;

FIG. 2 is a fragmentary plan view of the drive assembly taken on the line 2—2 of FIG. 1, looking in the direction of the arrows, and illustrating the drive assembly motor in its operating position;

FIG. 3 is a sectional view of the motor drive assembly shown in FIGS. 1 and 2 and taken substantially on line 3—3 of FIG. 2;

FIG. 4 is a sectional view taken substantially on the line 4—4 of FIG. 2;

FIG. 5 is a sectional view taken substantially along the line 5—5 of FIG. 2;

Referring now to the accompanying drawings in detail, and particularly to FIGS. 1, 2, and 3 inclusive wherein the entire drive assembly with which the present invention is particularly concerned is designated in its entirety by the letter T and shown incorporated in a clothes washing and centrifugal clothes drying machine comprising, in general, the component part assemblies respectively indicated as a clothes washing assembly W and a centrifugal clothes drying assembly Q disposed in a cabinet A exemplifying the external appearance of the machine, as shown in FIG. 1. The washing assembly comprises a tub B having an agitator C operatively disposed within the tub. The agitator C may be connected to any well known type of transmission (not shown) adapted to be drivingly connected to a source of motive power to impart an oscillatory motion to the agitator C. The centrifugal clothes drying assembly Q includes a tub D having a basket E adapted to be driven at high speed by a drive mechanism F and an electric motor M. The tubs B and D are mounted in the cabinet A by any suitable supporting structure, such as shown at H.

My improved drive assembly T of the belt and pulley type is mounted in the cabinet for operation by the motor M to rotate the basket at centrifugal clothes drying speed and to operate a pump P for disposal of the water extracted from the clothing in the tub D during the high speed rotation of the basket E.

The supporting structure H for the tubs B and D and the drive assembly T comprises a base formed of structural angle members to define a substantially square-box like base with the lower portions of the cabinet A secured to and supported by certain angle members of the base. The base comprises a transversely extending structural steel support member 11 of U channel section as shown more particularly in FIGS. 2 and 3 supported at opposite ends by structural steel parallel members of the base one of which is indicated at 12. A stub drive shaft 10 of the drive mechanism F is journalled in a sleeve bearing 13 disposed in the cylindrical bore of a hub 14, the lower portion of which is supported on the channel member 11 and the upper portion of the hub being supported by the bent plate support member 15 also carried by the transversely extending structural steel support member 11. It will be noted that, as the stub drive shaft 10 is rotatable in the sleeve bearing 13 and the hub 14 is fixed to the support members 11 and 15, the shaft will rotate on a fixed vertical axis. In operation, when the motor is operated, the driving mechanism F is effective to rotate the basket E for extraction of water from the clothing within the basket.

The drive shaft 10 is rotated by a pulley 16 secured thereto and rotatable by a V-belt 17 in driving relation with a driving pulley 18 carried by the drive shaft 19 of the motor M. The belt 17 also extends about and engages a driven pulley 20 secured to the vertically extending shaft 21 of pump P for disposal of the extracted water during the centrifugal clothes drying operation of the machine. The pump P is mounted on the support member 11, to dispose its driven shaft 21 and pulley 20 in the horizontal plane of the pulleys 16 and 18 for effecting drive of the pump, the pump being mounted in fixed relation to the support member 11.

The preferred embodiment of the improved drive assembly T, as shown in FIGS. 1, 2, and 3, is particularly adapted and designed to provide the advantageous feature that belt tension is automatically compensated in direct proportion to the motor load during energization of the motor M, and having the further desirable feature that all bearings for the driven shafts 10 and 21 and drive shaft 19 of the electric motor are completely unloaded of side thrust and the belt tension is completely removed when the washing machine is idle. For this purpose, the motor is provided with a pivot mounting permitting the motor to be bodily shifted, to a load position in which a constant automatic and proper tension is placed on the belt by virtue of the belt tension being automatically compensated in direct proportion to the motor load. More particularly, the motor body 22 is supported on an annular bracket support plate 23 having a central circular opening adapted to receive the hub 25 of the motor in spaced relation to the plate 23. The motor is mounted on the plate 23 by four bosses 27, forming an integral part of the casing of the motor body and two of which are shown in FIG. 3, with the bottom of the bosses 27 being seated on the plate 23. To securely connect the motor with the plate 23, conventional motor casing assembly bolts 29 extend into and through threaded cylindrical openings in the bosses 27 to securely fasten the plate 23 to the motor. The plate 23 and thereby the motor M are mounted upon a bracket or plate 36 having an upwardly extending wall 37 terminating in a flange 38 which may be welded or otherwise securely fastened to the laterally extending flange 39 of the channel member 11 as shown in FIG. 3, the opposite edge of the plate 36 terminating in a downwardly extending flange 40 received within and firmly secured to a supporting channel member 41 extending parallel to the support member 11 and forming a part of the supporting structure H.

The motor M and plate 23 are mounted on the plate 36 for unitary pivotal movement by a fixed pivot structure 46 in a manner that will now be described. More particularly, the plate 36 is provided with an arcuately shaped concavely curved guide track or slot 42 having one end of the slot terminating in a slot 44 through which the motor drive shaft 19 extends. The slot 42 is adapted to guidingly receive a slide or guide element indicated generally at 45 which also serves, with a fixed pivot structure 46, to support the plate 23 and motor M for pivotal movement about the fixed pivot structure 46 on the bracket 36. The structure of the slide element 45 is shown in FIGS. 2, 3, and 4 and comprises an annular nylon bushing 47 having a circular groove 48 receiving the spaced arcuate edges of the slot 42. Disposed between the bracket 23 and the bushing 47 is an annular rubber grommet 49. Another rubber grommet 50 is provided having diametrically smaller and larger portions with the diametrically smaller portion being received within the bushing 47 and engaging the bottom of the grommet 49 and the diametrically larger portion extending beneath and engaging the bushing 47. The described parts of the slide element 45 are securely connected to the plate 23 by a bolt and nut assembly, the bolt 51 extending through an opening in the plate 23 and downwardly through a cylindrical spacer 52 positioned within the openings in the grommet 49 and 50 and having its downwardly and outwardly extending end in threaded engagement with a nut 53 engaging a washer 54 seated against the bottom of the rubber grommet 50.

The fixed pivot structure 46 permitting rotation of the motor M and plate 23 relative to the fixed bracket 36 comprises an annular spacer 46a disposed between and engaging the plate 23 and bracket 36, a bolt 46b extending through the plate 23 and bracket 36 and pivotally connecting the motor and plate to the bracket for movement in a horizontal plane. The bolt is provided with washers 46c, 46c, and a nut 46d is suitably threaded onto the bolt to prevent disassembly of the pivot structure 46 with the plate and bracket while permitting relative rotation between the plate and bracket.

The plate 23 and the rear portion of the motor M is additionally supported on the plate 36 by a foot structure secured to the plate 23 and slidable upon the plate 36 during pivotal movement of the motor in a manner which will be presently described. More particularly and referring to FIGS. 3 and 5, this foot structure comprises a rubber grommet 55 received within an opening in the plate 23 and disposed between the plate 36 and the base 56 of a nylon button 57. The button base 56 has sliding relation with the plate 36 and its upstanding shank portion 58 extends upwardly and through the opening in the annular grommet 55 with the enlarged head of the button being effective to distend a portion of the rubber grommet extending upwardly of the plate 23 to afford means for maintaining the grommet and button in assembly with the plate 23 during pivotal movement of the motor M and plate 23 relative to the plate 36.

It will be apparent from this description that the motor is supported on the plate 36 and also that the motor may be bodily and pivotally movable relative to the plate 36 as controlled by the slide element 45 and guide slot 42 described, and the load on the motor by driving mechanism D and pump P. The slot 42 is geometrically designed and located in the plate 36 in a manner to afford a guiding control for the motor during bodily shifting movement of the motor under varying load conditions. The geometrical layout of the slot is effective to cause proper and automatic tensioning of the belt 17 during these motor load variations so that, while the axis of the motor shaft is displaced from one position to another position with respect to the axes of the driven shaft 10 and the pump driven shaft 21, all of these axes are maintained in a direct relation to each other to effect proper tensioning of the belt. While, by proper relationship of the parts, the slide element 45 may engage the end of its guide slot to maintain proper tensioning of the belt, it is preferred that the slide element 45 be maintained in spaced relation to the end of the slot 42 at all times when the motor is under load to ensure constant tension on the belt in the event the belt may stretch during use. In order to permit free pivotal movement of the motor drive shaft 19 with respect to the plate 36, the slot 44, provided in the plate 36, is of such dimension as to provide ample clearance of the motor shaft during movement of the motor shaft.

Concerning the pivotal movement of the motor, and referring to FIG. 2, it will be seen that rotation of the pulley 18 in the direction indicated by the arrow will cause a load to be placed on the motor by the drive mechanism F through its drive shaft 10 and also by the pump P through its shaft 21 and which load is transmitted to belt 17 and thereby to the motor. The load on the motor and the tendency of its pulley to move downwardly along the belt provides a cumulative effect causing the motor to pivot about the fixed pivot structure 46 so that the slide element 45 is urged along the slot toward the open lower end of the slot to the FIG. 2 position and guides the pivotal movement of the motor against the action of a spring 82 to ensure the proper and automatic tensioning of the belt, which is compensated in direct proportion to the motor load.

If desired, a very light tension spring 82 may be employed to maintain the belt 17 snugly in engagement with the drive pulley 18 to provide for a more effective driving relationship and also to prevent disengagement of the belt from the pulley 18 in the relaxed condition of the belt. More particularly, the spring has one end connected as at 83 to the edge of the plate 23 approximately midway between the upper and lower sides of the plate 23 (FIG. 2) and has its other end hooked as at 84 to the bottom of the V-shaped notch 85 located adjacent to the inner end of the cam slot 42 in the plate. This location of the spring provides an arrangement in which the spring is operative to bias the plate 23 and motor M to positions in which the belt snugly engages the drive pulley during drive and insures engagement of the belt with the drive pulley when the motor is idle.

A further feature of my improved drive assembly is that, when the machine is idle, the belt may be readily removed from the pulleys by movement of the motor shaft 19 within the slot 44 to the position toward the upper closed end of the slot 44 for relaxing the tension on the belt. This belt movement is automatically achieved as tension on the belt, when the motor is deenergized, will exert a force to cause the motor to pivot to the just described position to relieve all tension on the belt. This feature is advantageous as the bearings for the motor drive shaft and the drive mechanism and pump shafts are completely unloaded when the machine is idle.

In the event it is necessary to remove the motor from the washing machine for servicing or replacement, the motor can be readily removed and replaced in the washing machine as it is merely necessary to remove the four bolts of the bolt and nut assemblies securing the motor to the plate 23 whereupon the motor may be detached from the plate 23 and removed from the washing machine and subsequently, upon attachment of the motor to the washing machine, the four bolts may again connect the motor to the plate, whereupon the motor is again securely fastened to the plate 23.

While a preferred embodiment of the invention has been illustrated and described, many modifications may be made without departing from the spirit of the invention and, accordingly, the invention is not to be limited to the precise details of construction set forth but the latitude of such changes and modifications shall be governed by the breadth and scope of the language contained in the appended claims.

What is claimed is:

1. In a drive assembly including a frame; a plurality of spaced drive and driven pulleys having parallel axes of rotation, said driven pulleys being journaled on said frame; a belt interconnecting said pulleys for conjoint rotation; means for loading at least one of said driven pulleys; and a power unit having a drive shaft connected to said drive pulley, the improvement residing in means for mounting said power unit on said frame including a frame member, a support member secured to said power unit, and means connecting said frame and support members including fixed pivot means connecting said members, said drive shaft being vertically disposed for movement of said power unit and support member in a horizontal plane relative to said frame member, an arcuate track on said frame member, an element fixed to said support member and disposed within said track for guiding pivotal bodily shifting movement of said support member and power unit about said fixed pivot means and relative to said driven pulleys during rotation of the drive shaft to automatically tension said belt in proportion to the load on said power unit.

2. In a drive assembly as defined in claim 1 wherein spring means connect and is cooperatively related to said support and frame members and is operative to move the power unit and support member to maintain the belt in driving relation to said pulleys.

3. In a drive assembly including a frame; a drive pulley, a plurality of spaced driven pulleys, said pulleys having parallel axes of rotation defining a polygonal area, said driven pulleys being journaled on said frame; a belt interconnecting said pulleys for conjoint rotation; means for loading at least one of said driven pulleys; and a power unit having a drive shaft connected to said drive pulley, the improvement residing in means for mounting said power unit on said frame including a frame member, a support member secured to said power unit, means pivotally connecting said frame and support members and having a pivotal axis located within said area, an arcuate track on said frame member, and an element connected to said support member and received within said track for guiding pivotal bodily shifting movement of said support member and power unit relative to said driven pulleys during rotation of said drive shaft to tension said belt in proportion to the load on said power unit.

4. In a drive assembly including a frame; a plurality of spaced drive and driven pulleys having parallel axes of rotation, said driven pulleys being journaled on said frame; a belt interconnecting said pulleys for conjoint rotation; means for loading at least one of said driven pulleys; and a power unit having a drive shaft connected to said drive pulley, the improvement residing in means for mounting said power unit on said frame including a frame member, a support member secured to said power unit, said members having aligned openings through which said drive shaft extends, means mounting said support member on said frame member and including fixed pivot means connecting said members for vertically positioning said drive shaft and for pivotal movement of said power unit in a horizontal plane, an arcuate track on one of said members, and an element fixed to the other of said members, said arcuate track guiding pivotal bodily shifting movement of said support member and power unit relative to said driven pulleys during rotation of the drive shaft to tension said belt in direct proportion to the load on said power unit.

5. In a drive assembly as defined in claim 4 wherein said track is provided by a slot in said one member, and said element has a circular groove receiving the edges of said slot for sliding engagement of said element with said slot edges and for supporting said support member and said power unit on said frame member.

6. In a drive assembly including a frame; a plurality of spaced drive and driven pulleys having parallel axes of rotation, said driven pulleys being journaled on said frame; a belt interconnecting said pulleys for conjoint rotation; means for loading at least one of said driven pulleys; and a power unit having a drive shaft connected to said drive pulley, the improvement residing in means for mounting said power unit on said frame including a frame member, a support member secured to said power unit, and means connecting said frame and support members including fixed pivot means connecting said members to vertically dispose said drive shaft, said frame member having a concave arcuate track concentrically located relative to said fixed pivot means, and an element on said support member and cooperating with said track for permitting pivotal bodily shifting movement of said support member and power unit in a horizontal plane relative to said driven pulleys during rotation of the drive shaft to tension said belt in proportion to the load on said power unit, said members having aligned openings receiving said drive shaft to accommodate pivotal movement of said drive shaft, said element and track being located and arranged generally between said drive shaft pulley and said driven pulleys to permit tension of the belt to pivotally move the power unit and its drive shaft relative to said openings, and upon deenergization of said power unit, to a position, with respect to the driven pulleys, in which tension is completely removed from the belt.

7. In a drive assembly as defined in claim 6 wherein a spring has one end connected to said frame member and the other end connected to said support member adjacent the end of the track nearest to the drive shaft for moving the power unit and support member to maintain the belt in driving relation to the pulleys and also to prevent disengagement of the belt with the pulleys during deenergization of the power unit.

8. In a drive assembly as defined in claim 6 wherein said fixed pivot means, said element and said track are located and arranged to permit tension of the belt to pivotally move the power unit and its drive shaft in said opening in said frame member, upon deenergization of said power unit, to a position at the end of the track adjacent the motor shaft to completely remove tension on the belt.

9. In a drive assembly including a drive pulley, a plurality of spaced driven pulleys, said pulleys having parallel axes of rotation, a belt interconnecting said pulleys for conjoint rotation, means for loading at least one of said driven pulleys, and a power unit having a drive shaft connected to said drive pulley, the improvement residing in means for supporting said power unit with said drive shaft vertically disposed and for pivotal bodily shifting movement of said power unit in a horizontal plane relative to said driven pulleys dependent solely on the forces exerted on said belt by said drive pulley through the power unit and by said driven pulley through the loading means, during rotation of said drive shaft to tension said belt in proportion to the load on said power unit, said axes of said drive and driven pulleys defining a polygonal area, and pivot means for said power unit-supporting-means having an axis located within said area.

References Cited in the file of this patent

UNITED STATES PATENTS

| | | |
|---|---|---|
| 1,119,151 | Halbleib | Dec. 1, 1914 |
| 2,037,436 | Roddewig et al. | Apr. 14, 1936 |
| 2,074,078 | Swift | Mar. 16, 1937 |
| 2,292,536 | McCabe et al. | Aug. 11, 1942 |
| 2,629,263 | Klingens | Feb. 24, 1953 |
| 2,745,273 | Archbold | May 15, 1956 |